United States Patent
Norberg Ohlsson

(10) Patent No.: US 10,754,330 B2
(45) Date of Patent: Aug. 25, 2020

(54) INDUSTRIAL MACHINE SYSTEM AND A METHOD OF CONTROLLING AN INDUSTRIAL MACHINE

(71) Applicant: Tomologic AB, Stockholm (SE)

(72) Inventor: Magnus Norberg Ohlsson, Stockholm (SE)

(73) Assignee: Tomologic AB, Stockholm (SE)

(*) Notice: Subject to any disclaimer, the term of this patent is extended or adjusted under 35 U.S.C. 154(b) by 0 days.

(21) Appl. No.: 15/749,163

(22) PCT Filed: May 4, 2016

(86) PCT No.: PCT/EP2016/059993
§ 371 (c)(1),
(2) Date: Jan. 31, 2018

(87) PCT Pub. No.: WO2017/028969
PCT Pub. Date: Feb. 23, 2017

(65) Prior Publication Data
US 2018/0224833 A1 Aug. 9, 2018

(30) Foreign Application Priority Data

Aug. 14, 2015 (EP) .................................. 15181127

(51) Int. Cl.
*G05B 19/418* (2006.01)
(52) U.S. Cl.
CPC ............ *G05B 19/4185* (2013.01); *G05B 2219/31105* (2013.01); *G05B 2219/31241* (2013.01); *G05B 2219/34429* (2013.01); *G05B 2219/37077* (2013.01); *Y02P 90/18* (2015.11)

(58) Field of Classification Search
USPC ....................................................... 700/180
See application file for complete search history.

(56) References Cited

U.S. PATENT DOCUMENTS

| | | | |
|---|---|---|---|
| 2010/0023156 A1* | 1/2010 | Trepina | G05B 19/406 700/175 |
| 2013/0255220 A1* | 10/2013 | Mathews, Jr. | F02C 9/00 60/39.24 |
| 2015/0360318 A1* | 12/2015 | Aubry | B23K 26/0846 219/121.72 |

FOREIGN PATENT DOCUMENTS

| | | |
|---|---|---|
| CN | 104142627 A | 11/2014 |
| CN | 104808592 A | 7/2015 |
| WO | WO 2014/124701 A1 | 8/2014 |

OTHER PUBLICATIONS

S. Chen et al., "Research on Numerical Control Machine Tools Remote Control and Communication", New Technology & New Process, No. 5, May 25, 2013.

* cited by examiner

*Primary Examiner* — Mohammad Ali
*Assistant Examiner* — Joshua T Sanders
(74) *Attorney, Agent, or Firm* — Blank Rome LLP

(57) ABSTRACT

The invention relates to an industrial machine system comprising a machine (1) comprising an actuator system (2) for performing an industrial operation, and a remote computing system (6) comprising a machine controller (9). The machine controller is remote connected to the machine, and is configured to remote control the actuator system of the machine. The invention further relates to a method of controlling an industrial machine.

13 Claims, 2 Drawing Sheets

INDUSTRIAL MACHINE SYSTEM AND A METHOD OF CONTROLLING AN INDUSTRIAL MACHINE

TECHNICAL FIELD

The invention relates to an industrial machine system for performing an industrial operation, comprising e.g. 2D and 3D beam cutting, tube cutting, sawing, machining, milling, turning, punching, punch pressing, press-breaking, bending, welding, assembling operation and combinations of such machines and industrial automation of such machines, for transportation of material and/or components to the industrial machine and components and scrap from the industrial machine, and to a method of controlling industrial machinery.

BACKGROUND

An industrial machine system may comprise a machine with an actuator system for providing relative motion between a machine part or operating device and a workpiece. Non-limiting examples of industrial machine systems include machines for 2D and 3D beam cutting, tube cutting, sawing, machining, milling, turning, punching, punch pressing, press-breaking, bending, welding, assembling operation and combinations of such machines and industrial automation to such machines.

Conventionally such a machine has a CNC (Computerized Numerical Control) unit, NC (Numerical Control) unit and/or a PLC (Programmable Logical Control) unit giving instructions to the actuator system to perform required movements in order to perform industrial operations. The machine further has a machine controller, which comprises a computer, which may have a conventional operating system such as Windows or Linux and which is configured to give instructions to the CNC/NC/PLC unit based on machine controller instructions, such as G-code or XML. The machine controller includes or is connected to an HMI, and is configured to read programs and to gather process parameters so as to yield complete instructions to the CNC/NC/PLC unit for execution by the actuator system comprised in the machine. Conventionally, both the CNC/NC/PLC unit and the machine controller are physically included in the industrial machine, and the industrial machine forms an independent and self-contained industrial machine system wherein the machine controller forms an essential and physically connected part of the machine.

Typically, such a machine is a part of a CNC (Computerized Numerical Control) system. A CNC system may be defined so as to comprise a machine tool, referred to as a machine in this application, a part program, which is a detailed set of commands followed by the machine, and a machine controller (or machine control unit), which is a computer that stores the program and executes the commands into actions by the machine tool.

This type of conventional industrial machine system has its advantages. The machine itself forms a self-contained system which may operate individually and on its own. Therefore, this has become the de facto standard of industrial machines.

However, there is desire to control such a machine from a remote position in order to improve efficiency and operability of the machine. In U.S. Pat. No. 7,761,551 B2 a system is disclosed for providing remote control of a machine by means of secure communication between a service computer and a machine control at the machine.

The present invention aims to further improve industrial machine systems by revolutionizing this standard configuration of an industrial machine.

SUMMARY OF THE INVENTION

It is an object of the present invention to be able to simplify and improve the operation of industrial machines, facilitate service of the machine system and allow for a more flexible monitoring and control of industrial machines.

Thus the invention relates to an industrial machine system comprising a machine comprising an actuator system for performing an industrial operation, and a remote computing system comprising a machine controller, wherein the machine controller is remote connected to the machine, and wherein the machine controller is configured to remote control the actuator system of the machine.

The industrial operation performed by the actuator system may include two-dimensional or three-dimensional movements of an actuator of the actuator system and a workpiece relative each other, the actuator system comprising an actuator controller for controlling the actuator on a low level.

The industrial machine system further comprises a remote computing system and a machine controller remote from the machine, wherein a communication client may be arranged at the machine to be connected to the actuator controller and for establishing communication with said remote computing system, the machine controller being configured to remote control the actuator system via the actuator controller.

Hence, in accordance with an embodiment of the invention no machine controller is contained in the machine, such that the machine may only be operated via the remote connected machine controller. Further, since no machine controller is contained in the machine it is not possible to mirror a machine controller from a remote location. Instead, a complete machine controller needs to be provided at the remote location in order to achieve a fully functional industrial machine system.

The actuator controller may be a Computerized Numerical Control (CNC) unit that controls the at least one actuator on a low level.

The machine may comprise a computer readable storage medium for storing data that is transferred to the remote machine controller for decisions and analysis.

The remote machine controller and/or the industrial machine system may be connected to one or several industrial automation solutions for transportation of workpieces to the industrial machine system and workpieces or scrap from the industrial machine system.

The machine may be a machine tool, e.g. a machine for 2D or 3D beam cutting, tube cutting, sawing, machining, milling, turning, punching, punch pressing, press-breaking, bending, welding, assembling operation and combinations of such machines or industrial automation for transportation of material and/or components to the industrial machine and components and scrap from the industrial machine.

In the inventive system the machine controller is removed from the machine and located at a distance therefrom. Typically, a machine controller comprises or is connected to a HMI for reading programs and controlling of the machine. By removing the machine controller from the machine and connecting it to the actuator system by including it in a remote computing system the overall cost of the machine and the complexity of the machine is reduced. The service of the machine controller itself is facilitated since it may be performed centrally, at a remote location from the machine. The machine may also be accessed from various remote computing devices. The operation of a complete assembly of several industrial machines may be facilitated by commonly controlling them from the common remote computing system. For instance, one machine controller may be arranged to control several machines. Thus, the invention also provides for new ways of operating and maintaining industrial machines since the essential machine controller may be under control of the remote computing system and the machine may no longer be able to operate individually and on its own. Hence, the machine will itself not in itself comprise a machine controller or an HMI. The machine will merely be provided with simpler commands such as an on/off button, an emergency stop button and the like.

In this respect, remote means indicate means that are separate from, and not physically connected to the machine. The remote computing system may be a dedicated server system, or may be contained in a generic server system. i.e. a cloud computing system. Thus surveillance and control of the machine does not necessitate physical presence.

The machine may comprise a communication client configured to communicate with the machine controller. The communication client is a functional unit which enables the machine or any sub component of the machine to communicate with the machine controller, and may be hardware and/or software implemented. As an alternative any sub component of the machine, such as the actuator controller, may be configured to connect to the machine controller in itself. The machine controller may be configured to remote control the actuator system of the machine by transmitting machine code instructions. The communication is preferably performed wirelessly, but the machine is preferably also provided with a port for connection via wire/cable to a remote machine controller. The machine controller includes means for loading a program for communication to and execution by the machine Thereby the machine includes the minimal level of computing power for establishing and maintaining a communication channel between the machine and the remote computing system.

The machine controller may be remote connected to the machine via an internet connection or other remote connection such as Wi-Fi, Bluetooth etc. The connection may be via a firewall and/or proxy server. Any connection between the remote computing system and the machine may further be encrypted in order to increase the privacy of possibly sensitive machining data. Encryption may be provided by TLS (Transport Layer Security) HTTPS (communication over Hypertext Transfer Protocol within a connection encrypted by Transport Layer Security or Secure Sockets Layer) or a VPN (Virtual Private Network).

The machine controller may be hosted in a virtual machine in the remote computing system. Thus the cost associated with the machine may be reduced. The remote accessibility of the machine controller is increased facilitating e.g. machine maintenance. The solution also allows for integration and data mining for e.g. material supply chain and optimization of use of the machine capacity.

The system may comprise an actuator controller, e.g. a CNC (Computerized Numerical Control) unit, NC (Numerical Control) unit and/or a PLC (Programmable Logical Control) unit and/or another processor that exchange machining instructions with the actuator. The machine controller may be configured to remote control the actuator system of the machine via the actuator controller. Thus the machine may be controlled on a low level by low level machine instructions while allowing for remote control and thus reduced costs and improved accessibility. The machine controller may be connected to the actuator system of the machine via the actuator controller via a data transfer link and/or other processor(s). An actuator controller, e.g. an NC/PLC unit is configured to communicate instructions for numerical execution by the actuator system, i.e. performing a defined movement, rotation etc.

The actuator controller may be comprised in the machine. Thus the communication path between the actuator controller and the actuator system may be minimized.

The remote computing system may be configured to modify operational parameters of the actuator controller. Thus the machine may be controlled from a remote location, e.g. not needing physical presence.

The machine controller may be connected to a HMI (Human Machine Interface) unit. The HMI may be used by an operator of the machine, to input/output data and monitor the machine and its operation. The HMI unit may be remote connected to the machine controller via an internet connection. Thus the position of the HMI unit relative to the machine and relative to the remote computing system may be chosen and an operator may supervise and control the machine without necessary being physically present at the machine or the machine controller. The connection may be via a firewall and/or proxy server, and/or may further be encrypted in order to increase the privacy of possibly sensitive data. Encryption may be provided by TLS (Transport Layer Security) HTTPS (communication over Hypertext Transfer Protocol within a connection encrypted by Transport Layer Security or Secure Sockets Layer) or a VPN (Virtual Private Network). The HMI and/or remote computing system may be configured to require user identification of an operator, e.g. by requiring passwords or other identification means.

The machine may comprise a surveillance unit for monitoring operations by the machine, and wherein the surveillance unit may be connected to the remote computing system and configured to provide operational information to the remote computing system. The surveillance unit may be an imaging device, such as a camera etc. and may allow for remote monitoring and decision making.

The actuator system may comprise at least one actuator configured to control a relative movement of a work piece and an operating device of the machine to perform the industrial operation.

The machine may comprises a sensor system, wherein the machine controller is remote connected to the sensor system to receive sensor data, and wherein the machine controller is configured to remote control the actuator system of the machine in response to the sensor data. Thus the complexity of the machine may be reduced and limited to providing data to the remote computing system where the data may be processed and the machine controlled.

The machine controller may be configured to receive a machine program from a CAD/CAM system or from an operator.

The remote computing system may be configured to monitor an operational parameter of the machine, and disable the remote control of the actuator system of the machine by the machine controller when the operational parameter exceeds a threshold value. The operational parameter may be e.g. the operational time of the machine, the number of operational cycles of the machine etc. Thus, e.g. the disposability of the machine may be controlled and limited to e.g. a limited operational time of the machine, a limited number of operational cycles of the machine etc.

The remote computing system may be configured to collect machine and/or production data and transfer the machine and/or production data to another system for data analysis and/or optimization of e.g. supply chain, demand chain, maintenance or other big data.

The invention further relates to a method of controlling an industrial machine comprising
   providing a machine, comprising an actuator system for performing an industrial operation, which actuator system comprises at least one actuator configured to control a relative movement of a work piece and an operating device,
   establishing a communication link between the actuator system and a remote computing system comprising a machine controller removed from the machine, and
   remote controlling the at least one actuator of the actuator system of the machine by the machine controller over the communication link and via an actuator controller comprised in the machine.

Remote controlling the actuator system of the machine by the machine controller may comprise transmitting machine code instructions.

The communication link may be via a firewall and/or proxy server.

The communication link may be via an internet connection or other remote communication techniques such as Wi-Fi, Bluetooth etc.

The communication link may be encrypted, such as using TLS/HTTPS or a VPN.

The machine controller may be hosted in a virtual machine in the remote computing system.

The method may comprise providing a HMI (Human Machine Interface) for controlling the machine controller. The HMI may be used by an operator of the machine.

The method may comprise establishing a communication link between the HMI unit and the machine controller via an Internet connection or via other remote communication techniques such as Wi-Fi, Bluetooth etc.

The machine may comprises a sensor system, wherein sensor data is transmitted from the sensor system to the machine controller, and wherein the method may comprise remote controlling the actuator system of the machine in response to the sensor data.

The invention further relates to a computer program product comprising computer program code, which when executed enables a processor in a computer to perform the method disclosed herein.

The invention further relates to a non-transient computer-readable medium or media comprising data representing coded instruction sets configured for execution by a processor in a computer, the instructions comprising the method as disclosed herein.

The system, computer program product and non-transient computer-readable medium provide similar advantages as noted in relation to the corresponding features of the method disclosed herein.

BRIEF DESCRIPTION OF DRAWINGS

Various embodiments and examples related to the invention will now be described with reference to the appended drawing, where.

DETAILED DESCRIPTION OF EMBODIMENTS

Figure 1:
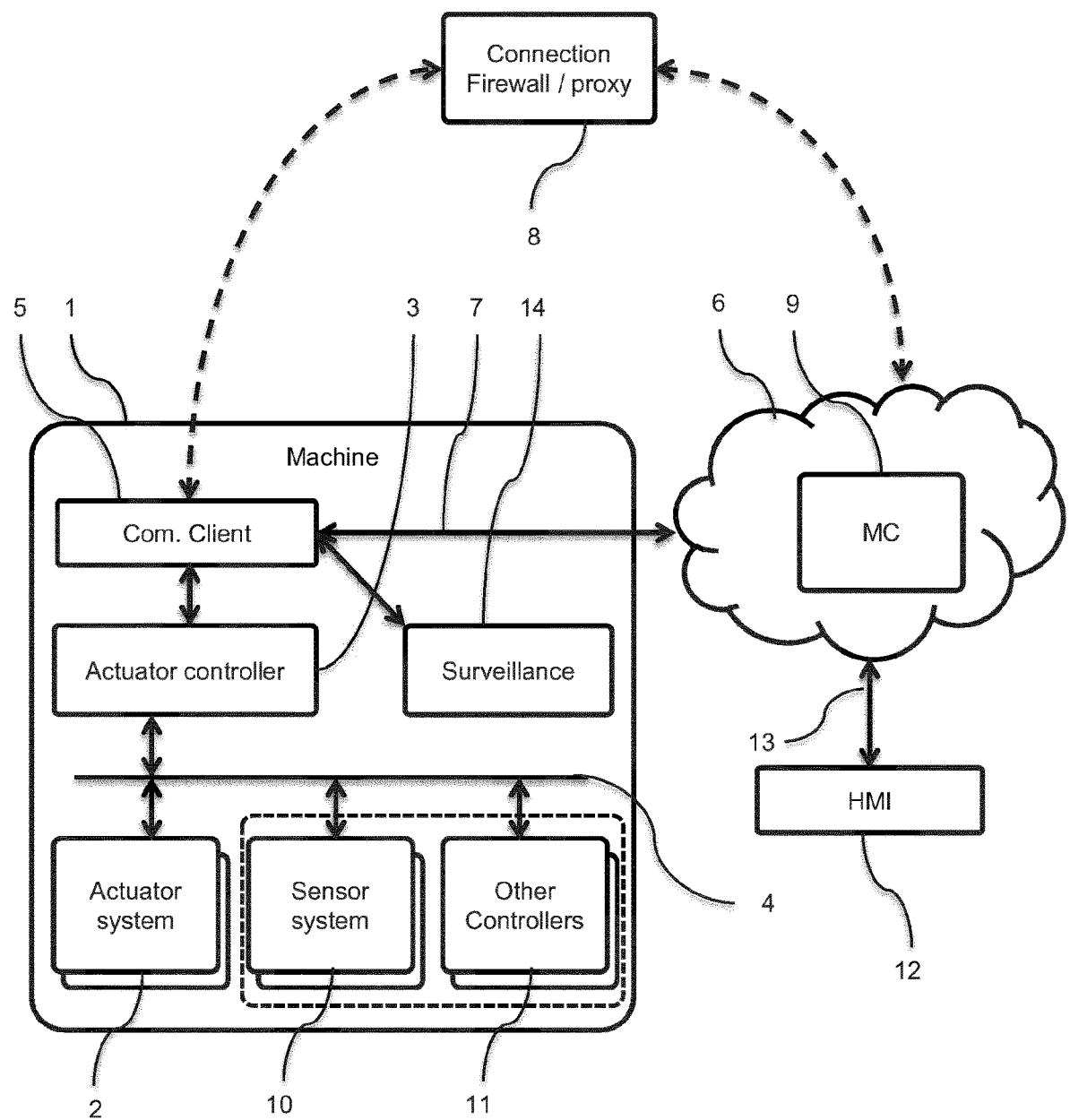
FIG. 1 shows an industrial machine system according to one embodiment.

In FIG. 1 an industrial machine system is shown. The system comprises a machine 1, such as a machine for laser cutting, welding, friction stir welding, ultrasonic welding, flame and plasma cutting, bending, spinning, hole-punching, pinning, gluing, fabric cutting, sewing, tape and fiber placement, routing, picking and placing, and sawing.

The machine comprises an actuator system 2 for performing an industrial operation. The actuator system comprises at least one actuator, i.e. a motor for linear or rotational movement. Typically the actuator system is configured for performing at least two-dimensional or three-dimensional movements of an operational part of the machine and a workpiece relative to each other.

The actuator system is controlled by an actuator controller 3 in the form of a CNC (Computerized Numerical Control), NC (Numerical Control) or PLC (Programmable Logical Control) unit. The actuator controller controls the actuator on a low level, i.e. by sending low level control commands for the actuation of the actuator system. The actuator system is connected to the actuator controller via a machine internal communication network 4, e.g. including a communication bus.

The machine optionally comprises other systems, such as a sensor system 10 for sensing various processing parameters of the machine and other controllers 11 for processors, networks, communication links or other computing devices for transmitting data and making decisions. These systems are also connected to the machine common internal communication network 4 and to the remote computing system such that the machine controller is remote connected to the sensor system to receive sensor data. The machine controller is further configured to remote control the actuator system of the machine in response to the sensor data.

The machine further comprises a communication client 5 connected to the actuator controller 3 for establishing communication with a remote computing system 6. The communication client is a functional unit which enables the machine or any sub component of the machine to communicate with the machine controller, and may be hardware and/or software implemented. The remote computing system may be a cloud based computing system connected to the internet. The communication client 5 and remote computing system may be configured to establish secure communication 7 with each other over the internet, e.g. by initiating encrypted communication by HTTPS/TSL or by establishing a VPN (Virtual Private Network). In one alternative the communication between the communication client and the remote computing system may be established over a firewall or a proxy server 8. As a further alternative, any sub component of the machine, such as the actuator controller 3, may be configured to connect to the remote computing system 6 in itself.

The remote computing system 6 comprises a machine controller 9, wherein the machine controller is remote connected to the machine, and wherein the machine controller is configured to remote control the actuator system of the machine via the actuator controller by modifying operational parameters of the actuator controller.

The machine controller 9 is hosted in a virtual machine in the remote computing system 6. In that way the machine controller resource may be exploited in an efficient way. The machine controller may e.g. be configured to read and execute machine program code, control machine parameters, allow manual control or adjustments of machine parameters, and function as an interface to associated systems. The machine controller is connected to a HMI (Human Machine Interface) unit 12 which may be remote connected to the machine controller via an internet connection 13 or included in the machine controller. Either way, an operator of the machine may supervise and control the operation of the machine from a remote location, e.g. connected to the internet. The HMI unit 12 and/or remote computing system 6 may be configured to require user identification of an operator, e.g. by requiring passwords or other identification means.

Below, a non-limiting embodiment of the inventive system as illustrated in FIG. 1 is described. Locally on the machine 1 an actuator system 2 comprising actuators for performing machining operations is included. An actuator controller 3 is part of or connected to the actuator system 2. The actuator controller is configured to receive instructions from the remote machine controller and execute instructions block by block in a closed loop system. Each task performed by an actuator is hence monitored and after a completed sub-operation the actuator, or another actuator will perform the next sub-operation until a whole operation is completed. This means that the operation of the actuators of the machine is controlled by the actuator controller on a low level. The actuator controller typically includes a memory and a processor in order to save and execute instructions and to log data. The actuator system does not involve a conventional machine controller or HMI. The actuator system of the machine is hence dependent on receiving instruction from the remote machine controller. Once a complete set of work instructions or a defined sub-set thereof have been received and verified it may however be executed without further instructions from the machine controller. A sub-set of work instructions may be a part of a complete machine operation, but at least involves enough information for the actuator system to perform a part of a complete operation. The operation is preferably performed step by step in a closed loop system within the machine. The machine is only furnished with simple functions such as an emergency stop button and an on/off button. Other than that the machine is dependent on commands from the remote machine controller to operate.

The machine controller is physically located remote from the machine, typically in the cloud. The monitoring of an ongoing process, loading of instructions, modification of instructions and creating new instruction may only be made at the remote machine controller. Hence, the inventive machine controller corresponds to a conventional machine controller, only it is not a physical part of the machine but remote connected to the machine. The instructions monitored and controlled by the machine controller and the interconnected HMI include operational parameters such as cutting velocity, cutting depth, pressure and so on. The machine controller is not part of the closed loop system of the actuator controller. Hence, unless new instructions are sent from the machine controller, the actuator system at the machine will conclude a fully received operation instruction without awaiting further instructions, unless specific instructions to conclude or alter the operation are received from the machine controller. Typically though, instructions are only provided for a full operation and new instruction will therefore only count for subsequent operations, not ongoing operations. This may be set as a safety arrangement but is up to the operator decide which type of operational security should be implemented.

The machine controller is configured to send instructions, instruction per instruction, or several instructions in a batch system. Any conventional manner of sending information may be utilized. Machine controller is further configured to receive information and make decisions based on said information. For example, the machine controller may act on feedback data and make decisions and/or send new instructions based on said feedback.

The inventive system provides for a possibility of remote controlling an industrial machine, without risking that commands are lost as a consequence of bad communication due to e.g. Internet latency. This is made sure e.g. because an operation is received and acknowledged in full at the actuator controller.

In order to facilitate surveillance, the machine comprises a surveillance unit 14, such as a camera, for monitoring operations by the machine. The surveillance unit is connected to the remote computing system 6 via the communication client 5 and configured to provide operational information to the remote computing system. The operational information is processed and transmitted to the HMI 12.

The machine controller is configured to receive a machine program from a CAD/CAM system or by manual entry from an operator, e.g. via the HMI unit 12.

In one embodiment the remote computing system is configured to monitor an operational parameter of the machine, and disable the remote control of the actuator system of the machine by the machine controller when the operational parameter exceeds a threshold value. Such an operational parameter may be the operating time, the number of operational cycles performed by the machine etc. Thus the operational costs and the use of the machine may be controlled and limited by limiting access to the machine controller.

The remote computing system is configured to collect machine and/or production data and transfer the data to another system (not shown) for data analysis and/or optimization. The machine data may be used to e.g. optimize the supply chain (purchase, manufacturing, distribution), the demand chain (marketing, sales, service), machine maintenance or for other big data applications.

Figure 2:
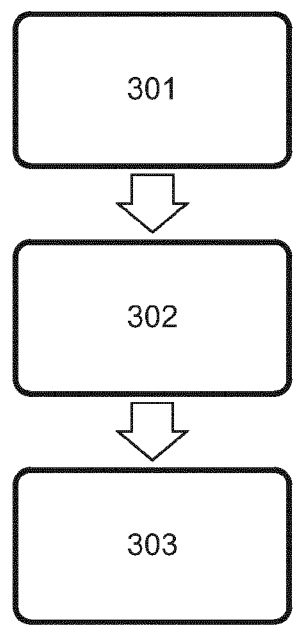
FIG. 2 shows a method of controlling an industrial machine.

In FIG. 2 a method of controlling an industrial machine is illustrated. The method comprises the steps of providing 301 a machine as disclosed herein, and comprising an actuator system for performing an industrial operation. A communication link between the actuator system and a remote computing system comprising a machine controller is established 302, and thereafter the actuator system of the machine is remote controlled 303 by the machine controller over the communication link.

The invention claimed is:

1. An industrial machine system, comprising:
a machine comprising an actuator system for performing an industrial operation, the actuator system comprising at least one actuator configured to control a relative movement of a work piece and an operating device, and
a remote computing system comprising a machine controller,
wherein the machine controller is separate from the machine and remotely connected to the machine via an internet connection, and wherein the machine controller is configured to remote control, over the internet, the at least one actuator of the actuator system of the machine via an actuator controller comprised in the machine, wherein the actuator controller controls the at least one actuator and is configured to receive instructions from the remote machine controller and execute said instructions block by block in a closed loop system within the machine, independent of the machine controller and without requiring internet delay compensation, wherein the machine controller is not part of said closed loop system of the actuator controller, and wherein, once a complete set of work instructions or a defined sub-set thereof have been received and verified, the complete set of work instructions or defined sub-set thereof may be executed without further instructions from the machine controller.

2. The system according to claim 1, wherein the actuator controller is configured to communicate instructions for numerical execution by the actuator system.

3. The system according to claim 1, wherein the machine comprises a computing device for transmitting data and making decisions.

4. The system according to claim 3, wherein the actuator controller comprises a Programmable Logical Control (PLC) unit that controls the at least one actuator.

5. The system according to claim 1, wherein the actuator controller is a processor that exchange machining instructions with the at least one actuator.

6. The system according to claim 1, wherein the machine controller is hosted in a virtual machine in the remote computing system.

7. The system according to claim 1, wherein the machine controller is connected to a HMI (Human Machine Interface) unit.

8. The system according to claim 1, wherein the machine comprises a surveillance unit for monitoring operations by the machine, and wherein the surveillance unit is connected to the remote computing system and configured to provide operational information to the remote computing system.

9. The system according to claim 1, wherein the machine comprises a sensor system, and wherein the machine controller is remote connected to the sensor system to receive sensor data, and wherein the machine controller is configured to remote control the actuator system of the machine in response to the sensor data.

10. The system according to claim 1, wherein the remote computing system is configured to monitor an operational parameter of the machine, and disable the remote control of the actuator system of the machine by the machine controller when the operational parameter exceeds a threshold value.

11. The system according to claim 1, wherein the remote computing system is configured to collect data and use the data for data analysis and/or optimization and/or transfer the data to another system for data analysis and/or optimization.

12. Non-transitory computer readable medium carrying a computer program product comprising computer program code, which, when read and executed by a machine controller of the industrial machine of claim 1, enables at least one actuator of the actuator system of the machine to control a relative movement of a work piece and an operating device according to a method comprising:
establishing an internet communication link between the actuator system and the remote computing system, and
remote controlling the at least one actuator of the actuator system of the machine by sending instructions from the machine controller to the actuator controller in the machine over the internet communication link, wherein the at least one actuator executes said instructions block by block in a closed loop system within the machine, independent of the machine controller and without requiring internet delay compensation, wherein the machine controller is not part of the closed loop system, and wherein, once a complete set of work instructions or a defined sub-set thereof have been received and verified, the complete set of work instructions or the defined sub-set thereof may be executed without further instructions from the machine controller.

13. A method of controlling an industrial machine comprising:
providing a machine, comprising an actuator system for performing an industrial operation, which actuator system comprises an actuator controller that controls at least one actuator configured to control a relative movement of a work piece and an operating device,
establishing an internet communication link between the actuator system and a remote computing system comprising a machine controller separate from the machine, and
remote controlling the at least one actuator of the actuator system of the machine by sending instructions from the machine controller to the actuator controller in the machine over the internet communication link, wherein the at least one actuator executes said instructions block by block in a closed loop system within the machine, independent of the machine controller and without requiring internet delay compensation, wherein the machine controller is not part of the closed loop system, and wherein, once a complete set of work instructions or a defined sub-set thereof have been received and verified, the complete set of work instructions or the defined sub-set thereof may be executed without further instructions from the machine controller.

* * * * *